United States Patent Office 3,201,477
Patented Aug. 17, 1965

3,201,477
HYDROBORATION USING BORANE-ALUMINUM ALCOHOLATES
Janos Kollonitsch, Westfield, N.J., assignor to Merck & Co., Inc., Rahway, N.J., a corporation of New Jersey
No Drawing. Filed Jan. 28, 1963, Ser. No. 254,450
8 Claims. (Cl. 260—606.5)

This invention relates to hydroboration reactions involving addition to an unsaturated carbon to carbon bond and, more particularly, to a method of forming organoborane compounds by such reactions.

The hydroboration reaction provides a convenient route from olefinic and acetylenic derivatives to organoboranes and to the many derivatives to which organoboranes can be converted. What is described herein is a novel hydroboration reaction which avoids the use of previously-employed hydroboration reagents, such as diborane, which have a tendency to explode under extreme reaction conditions.

In the present invention, a borane-aluminum alcoholate hydroboration reagent is used to effect selective additions to an unsaturated carbon to carbon bond system. This aluminum complex is milder in action than diborane and more reactive than conventionally used reducing agents such as sodium borohydride. Accordingly, it is used to advantage to effect additions to carbon to carbon unsaturated bonds in molecules which could not be as conveniently reduced in the past.

Another particular advantage of the reactions of the present invention is that they can proceed in a wide variety of solvents, including hydrocarbons, for example, hexane, benzene, cyclohexane, and ethers such as tetrahydrofuran, dibutyl ether and diethyl ether and chlorinated hydrocarbons such as carbon tetrachloride and chloroform, and in a wide range of mixtures thereof. Previously, only specified ether-type solvents could be used for hydroboration using diborane and borohydrides. The selectivity of the reagent of the present invention may be illustrated by the fact that it produces 1-octanol instead of 2-octanol as the hydroboration product of 1-octene. Similarly, chloro substitutions on an aromatic system remain intact after a hydroboration reaction is effected on it with the reagent of the present invention.

The borane-aluminum alcoholates used herein may be prepared in the manner described in U.S. Patent 2,903,470, issued September 8, 1959, to J. Kollonitsch, and in U.S. Patent 2,903,472, issued on the same date to the same inventor.

In accordance with a preferred method of the present invention, the aluminum starting material is reacted in solution with an olefinic compound at a reaction temperature to produce an organoborane which then may be oxidized, if desired, to form the corresponding alcohol. However, the invention is broad enough to include the formation of a reduced form of the unsaturated compound as a mixture which may be used for subsequent reactions. Alternatively, the desired organoborane compound may be produced by addition of a hydrolytic compound, such as water or alcohol, to the mixture of the aluminum starting material and the olefinic compound.

The method of the present invention affords a convenient and selective route to the reduction of an unsaturated bond, such as an olefinic carbon to carbon double bond, present within an organic molecule. Organic compounds which may be added to in accordance with the general principles of the invention are those organic molecules which contain an unsaturated carbon to carbon bond. Such bond systems are well known in the art and are present in a wide variety of organic molecules ranging from a straight chain olefin to a complex steroid. Nevertheless, all possess an unsaturated carbon to carbon bond which may be utilized herein. Accordingly, it is intended that the present invention, be considered in view of the broad teachings of the reaction described herein, namely, the use of a particular reducing agent in effecting selective addition to an unsaturated carbon to carbon bond. The examples which follow are merely intended to illustrate this invention and are not to be construed as a limitation thereto.

The following flow sheet is presented to illustrate pictorially an embodiment of the present invention wherein the borane-aluminum alcoholate is used to effect a hydroboration of an olefinic system:

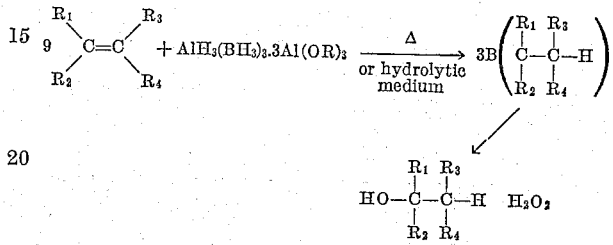

where R is a monoradical, such as alkyl, cycloalkyl and aralkyl which may be the same or different radicals and $R_1$, $R_2$, $R_3$ and $R_4$ are hydrogen or substituted hydrocarbon radicals.

The following examples will illustrate the invention:

EXAMPLE I

*Preparation of tri-iso-octylborane*

A mixture of 24 g. of borane aluminum-isopropylate BAP prepared in the manner described in U.S. 2,903,470 (0.0351 mol.) and 35.4 g. of 2,4,4-trimethyl-pentene-(2) (0.316 mol.) is heated at 100° for 2 hours. A small sample is quenched and gas chromatographed, indicating 88% reaction. After dilution with benzene it is quenched by careful addition of water followed by dilute HCl; the benzene layer is then washed acid free, dried over MgSO$_4$ and the residue obtained after distilling off the benzene is fractionated in vacuo at 0.3 mm. pressure. The main fraction at 86–90° is tri-isoctylborane which distills over in 81% yield.

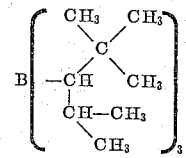

EXAMPLE II

*Preparation of tri-n-pentylborane*

A solution of 16.8 g. (0.24 mol.) of pentene-(1) in 30 ml. of benzene is added to a solution of 12.8 g. of BAP (0.0186 mole). While ice-cooling the mixture, 7 ml. of isopropanol is added over a period of one hour. The volume of hydrogen evolved during the addition indicates that one-third of the BAP is unreacted. Dilute HCl and benzene is then added, the layers are separated, the reaction mixture is extracted with more benzene, washed with water, saturated NaCl, dried over MgSO$_4$, the benzene is evaporated in vacuo at room temperature, and the residue is distilled at 0.5 mm. pressure to give at 79–80°, 8.5 g. of tri-n-pentylboron (72% of theory, based on the applied BAP; the theoretical yield is 3 mols of trialkylborane per mole of BAP).

EXAMPLE III

*Preparation of tri-n-hexylborane from hexene-(1)*

A mixture of 46 g. of BAP and 50.5 g. of hexene-(1) is heated in a bath of 90° for 4 hours. A small sample is quenched on ice-water, extracted with ether and gas-chromatographed, indicating that 93% of the hexene-(1) reacted. By working up the whole reaction product as in Example I, a 86% yield of tri-n-hexylborane is obtained.

EXAMPLE IV

*Preparation of tricyclohexyl-borane*

Method A.—32.8 grams of cyclohexene is added to 175 ml. of 0.3 molar solution of BAP in toluene and the mixture refluxed for one hour. Gas chromatography of a small sample indicated that 95% of the cyclohexene reacted. Worked up by the method used in Example I gives 27 g. of tri-cyclohexyl borane, B.P. 138–142° at 1 mm. of pressure, representing a yield of 67% of theory.

Method B.—Sixty-four grams of cyclohexene is added to 340 ml. of a 0.3 molar BAP solution in toluene; then while stirring at 0–5°, 50 ml. of isopropanol is added in 2 hours. Gas chromatographyy indicates that 94% of the cyclohexene reacted. Work-up as in Example II gives 81% yield of tri-cyclohexylborane.

EXAMPLE V

*Preparation of tri-(2,2-diphenylethyl) borane and its oxidation to 2,2-diphenyl-ethanol*

A mixture of 70 g. of BAP and 130 g. of 2,2-diphenylethylene is heated at 110° for 5 hours. Gas chromatography of an aliquot indicates 86% reaction. The borane forced is oxidized in situ; after dilution of the reaction mixture with 200 ml. of THF, a solution of 15 g. of sodium hydroxide in 200 ml. of methanol is added, followed by 110 g. of 30% $H_2O_2$ (added during one hour at 55°). Most of the solvent is removed in vacuo, ether is added, the ether washed with NaOH solution and water, dried over $MgSO_4$ and evaporated. By fractionating the residue at 2 mm. of pressure, 2,2-diphenyl-ethanol is obtained (76% of the theoretical yield). After recrystallization from isohexene, M.P. 63–64°.

EXAMPLE VI

*Hydroboration of styrene*

A mixture of 52.6 g. of styrene and 42 g. of BAP is heated at 90° for 5 hours. Gas chromatography indicates that 93% of the styrene applied reacts. The mixture consists of a 1:4 mixture of two hydroboration products below in the ratio

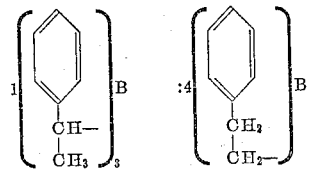

This is borne out by working up the reaction mixture by oxidation by $H_2O_2$ to the corresponding alcohols (as in Example V). A mixture of phenyl-methylcarbinol and β-phenylethylalcohol is obtained in the ratio 1:4, analyzed by G.C. (total yield 81% of theory).

EXAMPLE VII

*Hydroboration of octyne-(1) and oxidation of the octenyl-borane into octylaldehyde (5400-29)*

To 45 ml. of a benzene solution containing 12 g. of borane-aluminum isopropylate (BAP) there is added 7.4 g. of octyne-(1). 10 ml. of methanol is added with stirring, then 15 ml. of water and then 16 ml. of 15% $H_2O_2$ during 30 minutes; the pH meanwhile is maintained at 7–8 by dropwise addition of about 5 ml. of 3 N NaOH. The solution is then acidified with dil. HCl, extracted with ether, washed with dil. HCl water, then dried and the ether evaporated. The residual oil contains about 20% of the theoretical of octylaldehyde as assayed by formation of the 2,4-dinitro-phenylhydrazone.

EXAMPLE VIII

*Hydroboration and oxidation of 3,20-cycloethylenedioxi-5β-pregn-9(11)ene*

A mixture of 1 g. of the above compound and of 3 g. of BAP is heated at 130° for 2 hours. Twenty ml. of THF is added and the mixture is refluxed for 1 hour. The excess of the hydroborating agent is then decomposed by the careful addition of 19 ml. of water. After oxidation with $H_2O_2$ the solvents are then distilled off in vacuo. After cleaving off the ketol groupings by acidic hydrolysis, there is obtained 11β-hydroxy-5β-pregnane 3,20, dione (M.P. 191–193°, [α]$_D$: +82°).

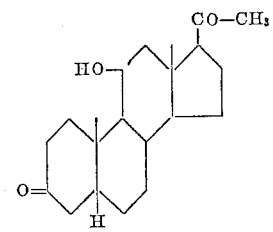

The yield is 65%.

EXAMPLE IX

*Reaction of hexane-3 with borane aluminum isobutylate*

To a solution of 33.6 g. of cis-hexene-3 in 50 ml. of THF, 32 g. of borane aluminum isobutylate is added and the mixture is refluxed for 8 hours. After evaporation of the solvent, 100 ml. of benzene is added, followed by careful addition of diluted HCl. The benzene layer is washed acid free, dried over $MgSO_4$, the benzene evaporated and the residue fractionated at 0.5 mm. of pressure to give at 79–80° 26 g. of tri-(3-hexyl)-borane.

EXAMPLE X

*N-octanol from octene-(1)*

A mixture of 10.4 g. of borane aluminum isopropylate, 11.2 g. of octene-(1) and 20 ml. of toluene is refluxed for 30 minutes. Oxidation and work-up in analogy to Example V gives n-octanol, yield 79% of theory.

Although is is not absolutely necessary, it is advisable to carry out the operations described in the above examples in a protective atmosphere of inert gas such as nitrogen. This precaution is particularly desirable where a borane aluminum alcoholate or an organo borane is being handled.

While the invention has been described with particular reference to particular embodiments thereof, it is not to be so limited since changes and alterations may be made therein which are within the full intended scope of this invention as defined by the appended claims.

What is claimed is:

1. A process for preparing organoborane compounds of the formula

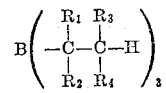

where $R_1$, $R_2$, $R_3$ and $R_4$ are each selected from the group consisting of hydrogen and a hydrocarbon radical, which comprises reacting a borane-aluminum alcoholate having the formula $$AlH_3(BH_3)_3 3[Al(OR)_3]$$

where each R is selected from the group consisting of alkyl, cycloalkyl and aralkyl, with an unsaturated organic molecule having the formula

where $R_1$, $R_2$, $R_3$ and $R_4$ are as defined above.

2. A process for preparing trioctylborane which comprises reacting a borane-aluminum alcoholate having the formula $$AlH_3(BH_3)_3 3[Al(OR)_3]$$

where each R is selected from the group consisting of alkyl, cycloalkyl and aralkyl, with octene-1.

3. A process for preparing organoborane compounds of the formula $$B\left(\begin{array}{cc} R_1 & R_2 \\ -C=C-H \end{array}\right)_3$$

where $R_1$ and $R_2$ are each selected from the group consisting of hydrogen and a hydrocarbon radical, which comprises reacting a borane-aluminum alcoholate having the formula $$AlH_3(BH_3)_3 3[Al(OR)_3]$$

where each R is selected from the group consisting of alkyl, cycloalkyl, and aralkyl, with an unsaturated organic molecule having the formula $$\begin{array}{c} R_1\ R_2 \\ C \equiv C \end{array}$$

where $R_1$ and $R_2$ are as defined above.

4. A process for preparing organoborane compounds of the formula $$B\left(\begin{array}{cc} R_1 & R_3 \\ -C-C-H \\ R_2 & R_4 \end{array}\right)_3$$

where $R_1$, $R_2$, $R_3$ and $R_4$ are each selected from the group consisting of hydrogen and a hydrocarbon radical, which comprises reacting a borane-aluminum alcoholate having the formula $$AlH_3(BH_3)_3 3[Al(OR)_3]$$

where each R is selected from the group consisting of alkyl, cycloalkyl and aralkyl, with an unsaturated organic molecule having the formula $$\begin{array}{c} R_1\ R_3 \\ C=C \\ R_2\ R_4 \end{array}$$

where $R_1$, $R_2$, $R_3$ and $R_4$ are as defined above in a hydrolytic medium.

5. A method in accordance with claim 4 wherein said hydrolytic medium is water.

6. A method in accordance with claim 4 wherein said hydrolytic medium is an alcohol.

7. A process for preparing organoborane compounds of the formula $$B\left(\begin{array}{cc} R_1 & R_3 \\ -C-C-H \\ R_2 & R_4 \end{array}\right)_3$$

where $R_1$, $R_2$, $R_3$ and $R_4$ are each selected from the group consisting of hydrogen, alkyl and phenyl, which comprises reacting a borane-aluminum alcoholate having the formula $$AlH_3(BH_3)_3 3[Al(OR)_3]$$

where each R is selected from the group consisting of alkyl, cycloalkyl and aralkyl, with an unsaturated organic molecule having the formula $$\begin{array}{c} R_1\ R_3 \\ C=C \\ R_2\ R_4 \end{array}$$

where $R_1$, $R_2$, $R_3$ and $R_4$ are as defined above.

8. A process for preparing organoborane compounds of the formula $$B\left(\begin{array}{cc} R_1 & R_3 \\ -C-C-H \\ R_2 & R_4 \end{array}\right)_3$$

where $R_1$, $R_2$, $R_3$ and $R_4$ are each selected from the group consisting of hydrogen, alkyl and phenyl, which comprises reacting a borane-aluminum alcoholate having the formula $$AlH_3(BH_3)_3 3[Al(OR)_3]$$

where each R is selected from the group consisting of alkyl, cycloalkyl and aralkyl, with an unsaturated organic molecule having the formula $$\begin{array}{c} R_1\ R_3 \\ C=C \\ R_2\ R_4 \end{array}$$

where $R_1$, $R_2$, $R_3$ and $R_4$ are as defined above in a hydrolytic medium.

References Cited by the Examiner

UNITED STATES PATENTS 2,903,470   9/59   Kollonitsch _____ 260—448

OTHER REFERENCES

Brokaw et al.: J.A.C.S. 72, pages 1793–95 (1950).
Brown et al.: J.A.C.S. 81, pages 6423–37 (1959).
Brown et al.: J.A.C.S. 82, pages 4708–12 (1960).

LEWIS GOTTS, *Primary Examiner.*